United States Patent [19]
Marechal

[11] 3,823,900
[45] July 16, 1974

[54] SUCTION SECURITY DEVICES
[75] Inventor: Robert René Marechal, Paris, France
[73] Assignee: Societe Industrielle et Commercial de Materiel Aeronautique (S.I.C.M.A.), Issoudun, France
[22] Filed: Apr. 20, 1972
[21] Appl. No.: 245,925

[52] U.S. Cl............................ 244/118 P, 296/1 R
[51] Int. Cl...................... B64d 11/04, B64d 11/06
[58] Field of Search......... 244/118 R, 118 P, 122 R; 248/206 R, 363; 294/64 R, 65; 105/325, 327; 114/188, 194; 297/194, 217; 312/235, 250, 236, 237, 201; 137/625.27; 296/1 R

[56] References Cited
UNITED STATES PATENTS
1,049,793  1/1913  Woods........................... 137/625.27
1,720,197  7/1929  Ball.............................. 137/625.27
2,565,793  8/1928  Weismantel....................... 248/363
2,936,139  5/1960  Lindstrom....................... 248/206 R
3,179,208  4/1965  Umanoff......................... 244/118 P
3,219,380  11/1965 Carliss.......................... 294/64 R
3,227,481  1/1966  Creskoff......................... 294/64 R
3,314,676  4/1967  Fromm........................... 294/64 R
3,437,390  4/1969  Evans............................ 312/237
3,602,543  8/1971  Sjodin.......................... 248/363
3,694,020  9/1972  Becker et al.................... 294/64 R
3,751,101  8/1973  Miller et al..................... 296/1 R Primary Examiner—Trygve M. Blix
Assistant Examiner—Galen L. Barefoot
Attorney, Agent, or Firm—Arnold Robinson; William D. Lucas; Frank J. DeRosa

[57] ABSTRACT

A device particularly suited to securing aircraft serving trolleys to seats during flight. The seat is fitted with a panel which is provided with an airtight seal. When the trolley is placed against the seal it operates a projecting valve member which causes air trapped in the space between the trolley and the panel to be exhausted and to thereby hold the trolley to the panel by suction. A further manually operable valve placed in a convenient position serves to connect the said space with the air in the cabin thereby allowing the trolley to be released. Suction can, in the case of a pressurised aircraft, conveniently be applied by connecting the space to the outside of the aircraft.

10 Claims, 13 Drawing Figures

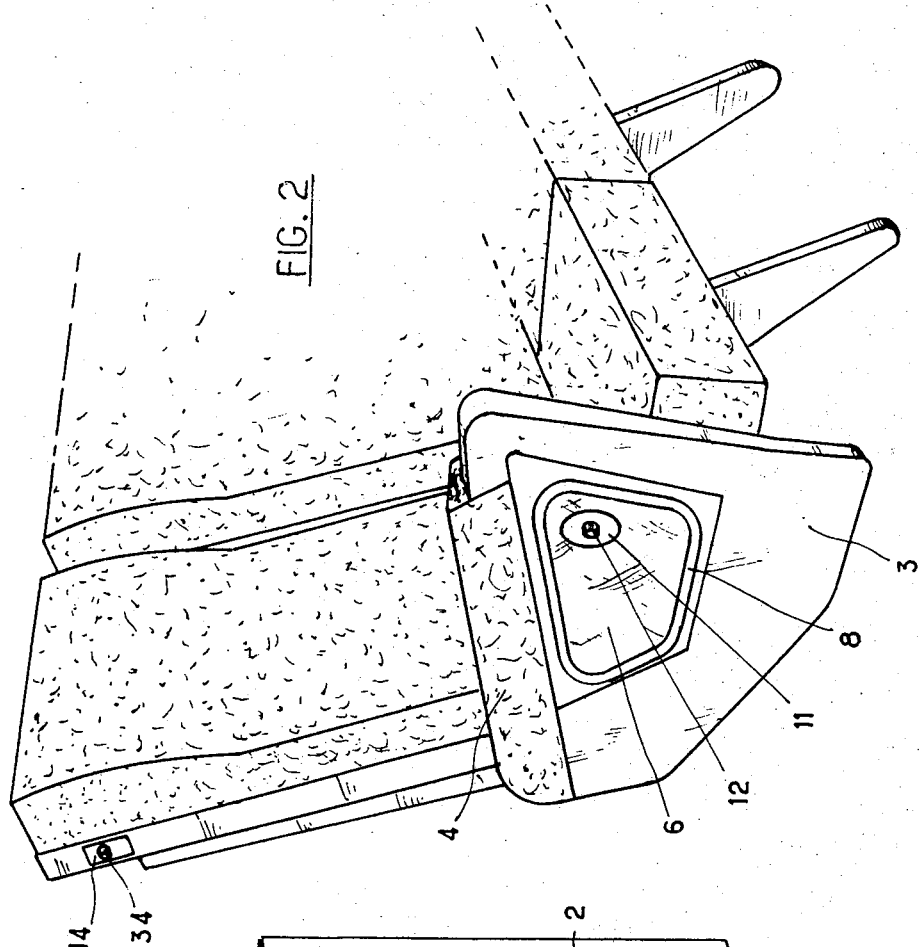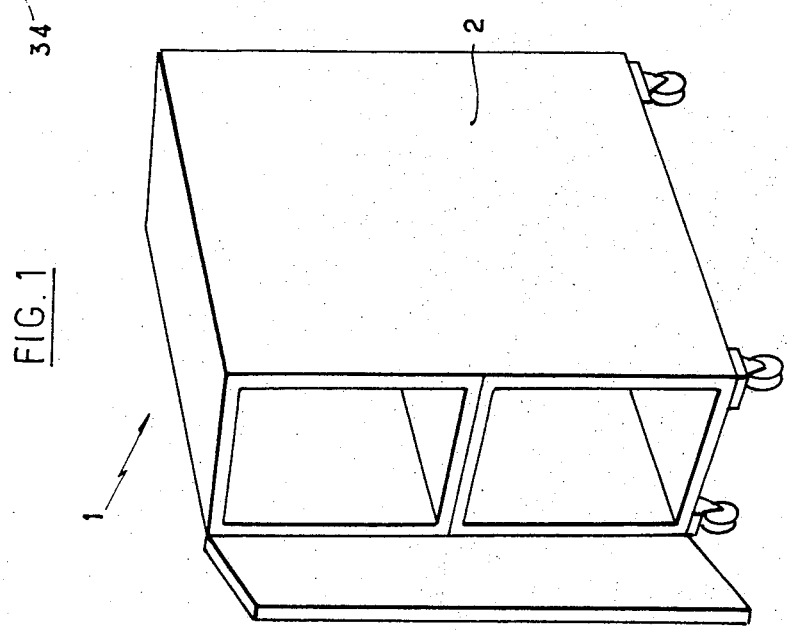

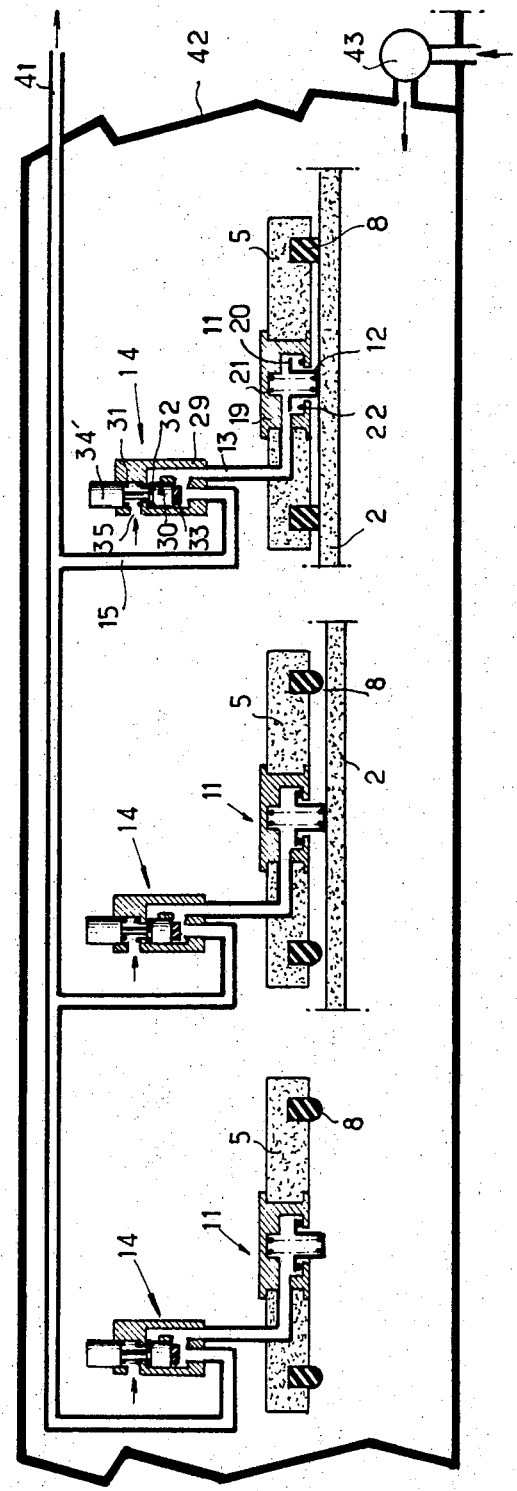

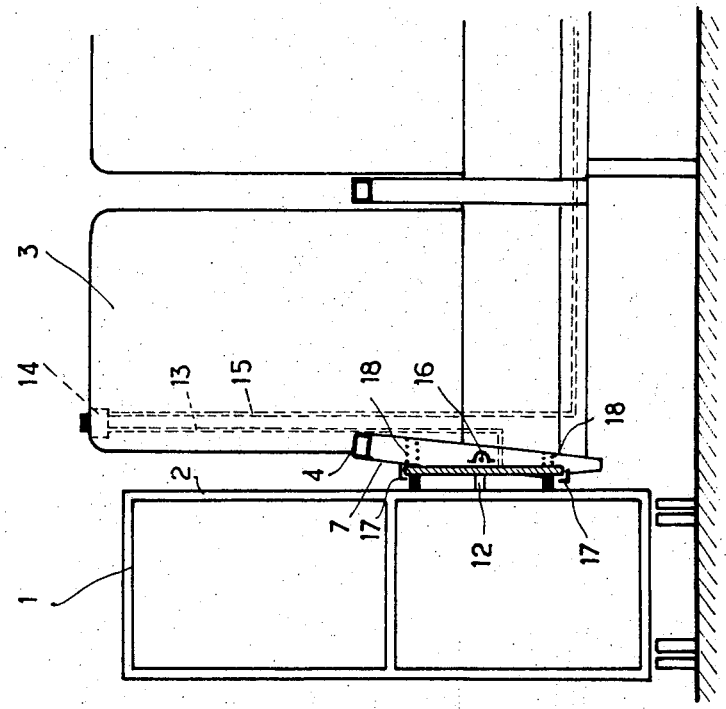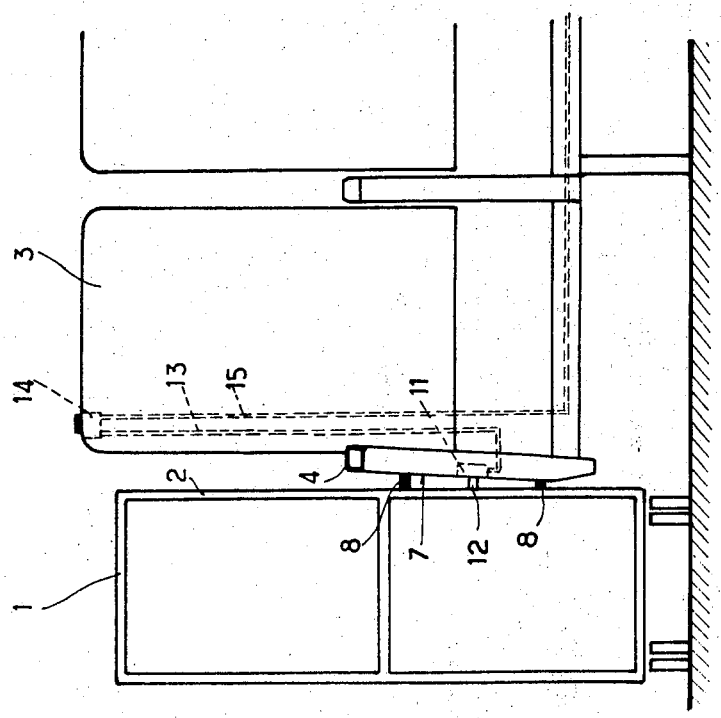

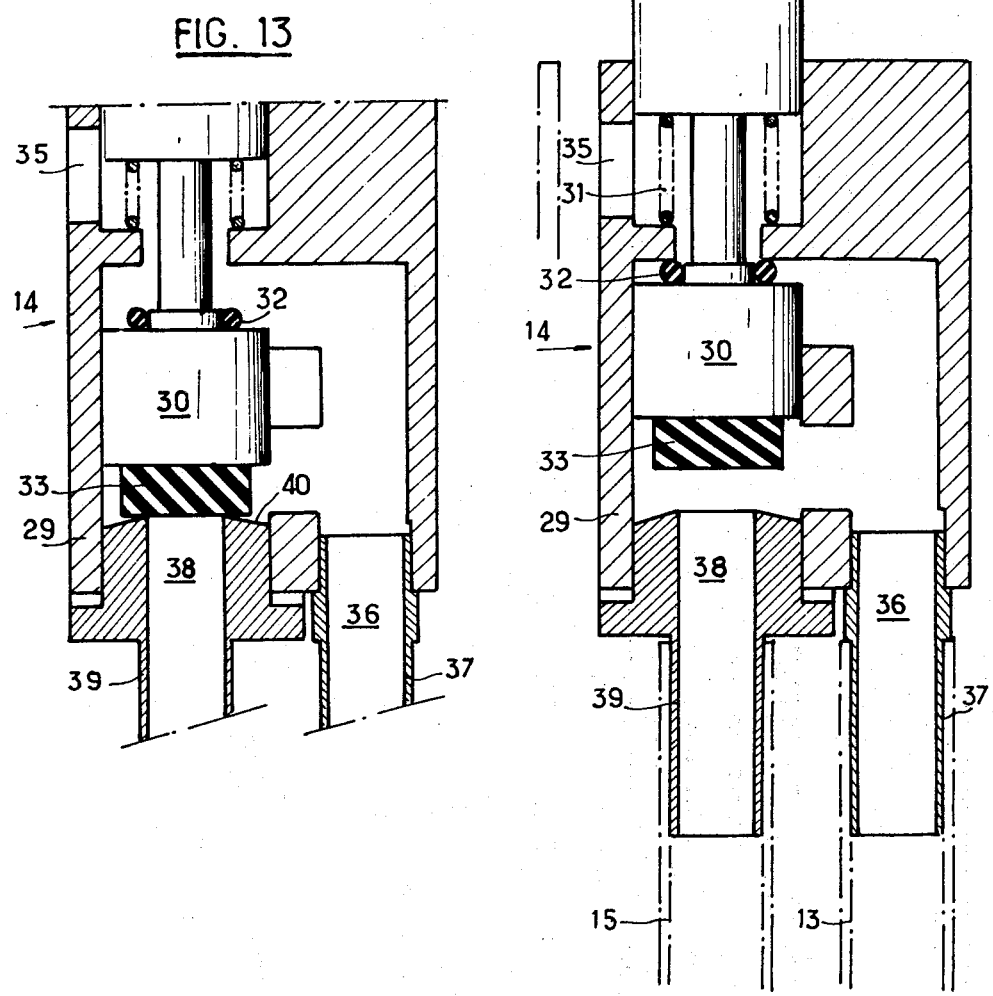

SUCTION SECURITY DEVICES

The present invention relates to suction security devices for securing a movable object onto a piece of furniture in an environment subject to accelerations other than that due to gravity. A particular form of the invention relates to suction security devices for securing serving trolleys to aircraft seats.

For some years now, on board commercial aircraft, trolleys, also known as servers, have become widely used for serving meals to passengers.

For the sake of convenience the terms above, below, top and bottom as used herein refer to the position of the device when the piece of furniture upon which it is mounted is in its normal in use position. The front of the device as used herein means the side on which the object to be secured is disposed when it is in its secured position. The terms side and rear have their usual meaning when taken with the above definition of the term front.

For the service of meals, these trolleys are withdrawn from the kitchen on board the aircraft and pushed through the aircraft gangway or gangways, being halted from time to time in order to carry out serving, for example every two or three rows of seats, the halts lasting 2 to 3 minutes.

Experience has shown that these trolleys have to be equipped with a braking or security device which will give them adequate stability during the following conditions:

When the longitudinal axis of the aircraft is inclined, for example during take-off and landing, the trolley has to be prevented from rolling under its own weight towards the front or rear of the aircraft.

When the aircraft is in the cruise configuration but in turbulent conditions, vertical accelerations can result in a free-standing trolley being thrown up to the ceiling of the cabin whereafter it may drop onto the passengers;

If the trolley is fairly narrow and high, it is also relatively unstable in the transverse direction and it is desirable to be able to fix it at the location of each serving.

In order to satisfy at least some of these three conditions which each apply in relation to one of the three axes of the aircraft, a variety of solutions have already been proposed and tried out.

In a first case, the trolleys are equipped with two lateral flaps articulated to their base and extending over the whole of their length. Before a trolley enters a gangway, these flaps have to be folded down and then pass beneath the overhanging seats.

This artifice does, it is true, prevent the trolleys from being hurled upwards in conditions of tubulance. However, it also has drawbacks. It does not work on a sloping surface and the trolley has additionally to be equipped with a brake on its wheels. It increases the width of the trolley and this affects stowage in the aircraft kitchen. In addition, it cannot be used in situations where the seats do not overhang at both sides of the gangway.

In another solution, the trolleys are equipped with hinged edges which are pivoted to retain the trolley in cooperation with an opening in the armrests. This system involves numerous difficulties and in fact is virtually never used.

In a third solution, the trolley is equipped with a brake which has to be released in order to be able to move the trolley. This device has in fact been largely abandoned because of its size in relation to aircraft kithen furnishings and because of the difficulty of using it. It is, of course, ineffective in turbulent situations and is also not much use on slopes exceeding 20°.

It has also been proposed that the trolley be equipped with a brake, that it be secured to the seats by lateral straps and that it be secured to the floor by a special connection to which the underside of the trolley has to be attached. However, once again, the drawbacks associated with the brake are encountered. In addition, securing by straps is a difficult operation for the cabin staff. Operations have to be carried out at both sides of the trolley. Even then, the trolleys are simply secured and not immobilized. They can still lift high enough to injure the nearest passenger. The straps are often designed to coil up in the trolleys but they occupy a certain volume there and this in turn has repercussions upon the dimensions of the kitchen furnishings in which the trolleys are parked. Attachments to the floor are sometimes located in the kitchen fitting zones and doors. They take the form of a steel mushroom which has to be raised from the floor and is engaged by a yoke fixed beneath the table. This manoeuvre is a trickly one to perform in turbulent conditions.

It will be seen from the foregoing that none of the existing devices provides a complete and satisfactory solution to the three conditions hereinbefore set out. Some of them are extremely expensive in terms of the volume, weight and cost of the installation. All of them are deficient in one direction or another and virtually none of them with the exception to some extent of the brake, makes for easy and rapid operation. This latter requirement is extremely important because it is a determining factor in deciding the practical efficiency of the system. Experience has shown, in other words, that devices which require anything more than one simple, quasi-automatic manoeuvre are simply not used by the cabin staff and are therefore to all intents and purposes ineffective.

The object exists to provide a device for securing trolleys on board pressurised commercial aircraft, which is efficient in relation to all the three axes of motion of the aircraft, is simple and quick to operate, economic in terms of the space it occupies and its weight, and has an economical installation and maintenance cost.

According to the present invention there is provided a suction security device for securing a movable object, having at least one substantially flat rigid smooth and upright panel, to a piece of furniture in an environment subject to accelerations, comprising a suction panel disposed, in use, in the side of the piece of furniture to which the object is to be secured, and constituted by a rigid wall having an upright generally flat supporting face, surrounded by a seal, which face, in use, stands proud of the seat at the front thereof, said supporting face having a surface of such shape and dimensions that in the operative condition of the device, it is completely covered by the panel on the object to be secured, and said seal being constituted continuous resilient strip which, in the inoperative condition of the device exhibits a substantially constant protuberance from the supporting face over the whole of its length so as to define a plane of protrusion parallel to the supporting surface, comprising a first valve, closed in the rest condition and located to the rear of said supporting surface, said valve communicating firstly with an opening in said supporting face, and secondly with a source of suction, said valve being provided with means for automatically opening it when the panel of the object to be secured is applied against the suction panel, with the result that the source of suction is made to communicate with a closed space is delimited between the suction panel, the seal and the panel of the object to be secured, enabling at least some of the air contained in said space to be drawn off to the suction source whereby the panel of the object to be secured is applied more firmly against the supporting face and is maintained there, and comprising a second manually operated three-way valve, having its operating means disposed remote from the suction panel connected between said first valve, the suction source and with air at the pressure of the air surrounding the object to be secured outside said closed space, said valve being arbitrarily operable to cut off communication between the panel and the suction source and to simultaneously, place said panel in communication with the air at the pressure surrounding said object, whereby said last-mentioned air can be returned to the space defined between the panel of the object to be secured, the vacuum panel and the seal, to release said object from the suction panel.

The invention is particularly suitable if the object to be secured is an aircraft serving trolley and if the piece of furniture is an aircraft seat, in which case, it is particularly convenient if the suction panel is, in use, disposed on a side of the seat facing a gangway below the level of armrests on said seat. If furthermore the aircraft is pressurised, it is particularly convenient if the suction source is constituted by the atmosphere outside the aircraft.

For the sake of convenience the in use condition of the device means when it is fitted to the piece of furniture and the operative condition of the device means the condition of the device when the object is fully secured to the piece of furniture. The inoperative or rest condition means the condition of the device when the object is not in contact with the device and when the valves are in their normal state consistent with this condition.

The present invention will now be described by way of example and with reference to the drawings, in which;

FIG. 1 is a perspective view of an aircraft serving trolley suitable for use with a security device in accordance with the invention;

FIG. 2 is a perspective view of an aircraft seat fitted with a security device in accordance with the invention;

FIG. 6 is a diagram illustrating the interconnection of a plurality of suction panels with one another, with the external atmosphere and with the fusillage interior of an aircraft;

FIG. 7 is a side view, partly in section, illustrating the attachment of a trolley to a suction panel not parallel to it;

FIG. 8 is a side view, partly in section, illustrating the attachment of a trolley to a suction panel which is pivotably mounted on the seat;

FIG. 12 is a sectional view of a manually operated valve, suitable for use in the device shown in FIG. 2, in the inoperative position; and FIG. 13 is a view similar to that of FIG. 12, showing the valve in a release position.

Figure 3:
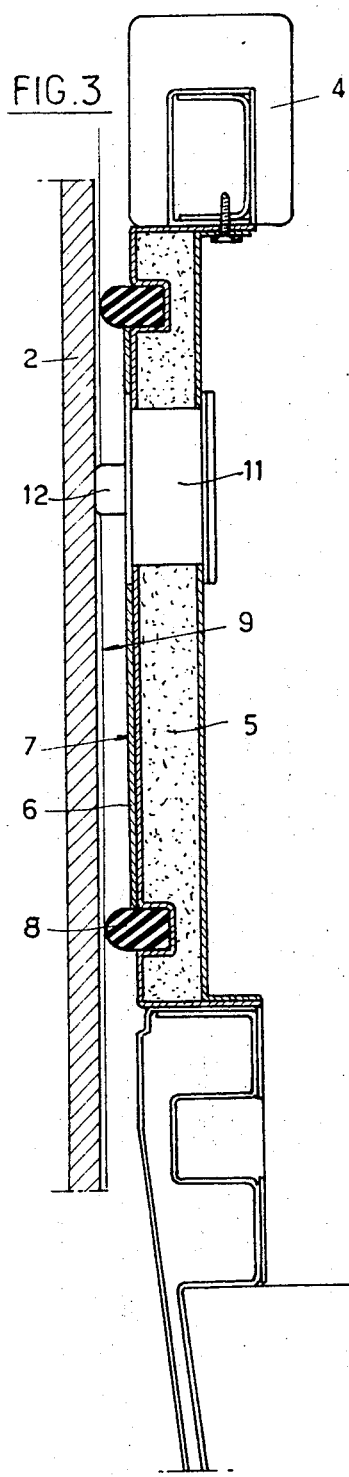
FIG. 3 is a vertical section through one form of suction panel suitable for use in the device shown in FIG. 2.

In FIG. 1, the reference 1 indicates a trolley comprising two flat side panels 2 which are rigid, perpendicular to the cbin floor and have a relatively smooth surface.

Certain seats 3 in the aircraft, for example on in every three located at one and the same side of the gangway, are provided below the level of their armrests 4, with a suction panel 5. One such seat is shown in FIG. 2. This panel is constituted by a wall located below the armrest 4 and which has a surface 6 which stand proud, by a few millimetres, on the gangway side of the seat, in relation to the structure and fittings of the seat, including armrest and flank.

Figure 4:
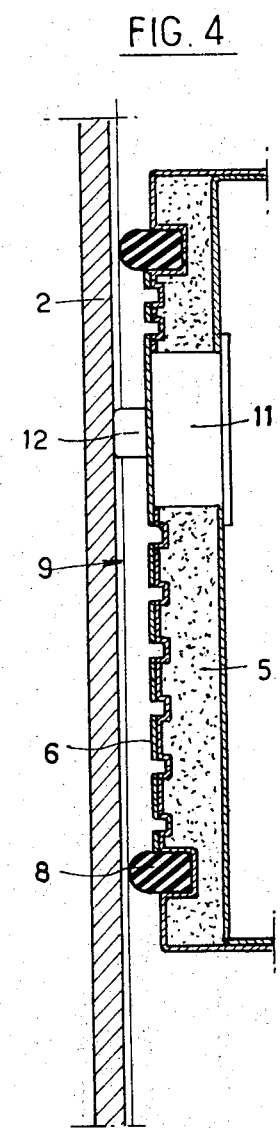
FIG. 4 is a view similar to that of FIG. 3 showing a further form of suction panel.

In the embodiment shown in FIG. 3, the panel 5 is a sepatate component and is rigidly fixed in an opening left the seat flank. The surface of the panel is flat and provided with a rough non-slip lining material 6. In the variant embodiment, as shown in FIG. 4, the surface of the panel 5 is grooved. It could in fact equally well be corrugated.

The panel 5 should have the maximum surface area possible consistent with the configuration and aesthetic appearance of the seat. To prevent any deformation of the flank 2 of the trolley 1 during use, the panel should be against the vacuum at a number of support points. All these points should, preferably, be in the same plane 7, namely the supporting plane. The panel 5 should, furthermore, permit free circulation of air between it and the wall 2 and this is why it is preferable that the panel should have a rough, grooved or corrugated surface, rather than a smooth one.

A resilient seal 8 borders the panel 5 at its periphery and projects beyond the gangway side of the seat. In the embodiment shown in FIG. 3, this seal is fitted in a recess in the panel 5, substantially half the seal being disposed in the recess. This disposition gives the seal great flexibility and enables it to withdrawn completely back to the level of the supporting surface 7, under the pressure exerted by the flank 2 of the trolley. In this position, the seal 8 provides effective sealing whilst avoiding any risk of being torn away by the vertical or sideways forces exerted parallel to the supporting surface. The height of the seal 8 in the inoperative condition, in relation to the supporting surface 7, is constant and this seal thus defines a plane of protrusion 9 parallel to the supporting plane.

In that surface of the panel 5 delimited by the seal 8, an opening 10 (see FIG. 10) is formed, which communicates with a valve 11 that is closed in the inoperative condition and is controlled by a button 12 projecting a few millimetres away from the protrusion plane 9. In the fully depressed condition, the button 12 is flush with the supporting surface (or plane) 7. The body of the valve does not protrude at all in relation to this supporting surface.

Through a pipe 13 (see FIGS. 6 to 8), the valve 11 communicates with a three-way valve 14. The latter, which is assembled outside the panel 5 in order to be readily accessible to the cabin staff, is connected to the line 13, to the cabin interior and, through a line 15, to a common line 41. In FIG. 6 it has been assumed that the aircraft is pressurised, In this case the line 4 connects with the external atmosphere, all those seats equipped with a vacuum panel. As FIG. 6 shows, this line passes through the aircraft fusillage 41. The interior of the fusillage is, of course, maintained at a certain pressure by a compressor 43.

In the inoperative condition, the valve 11 is connected permanently, through the valve 14, to the pressure prevailing outside the aircraft. It is normally closed and the device creates no permanent pressurisation leak.

On the ground, since the pressure differential is zero, the device is ineffective, but, a little after take-off, around five minutes in fact, the pressure difference is sufficient to operate the device.

Figure 5:
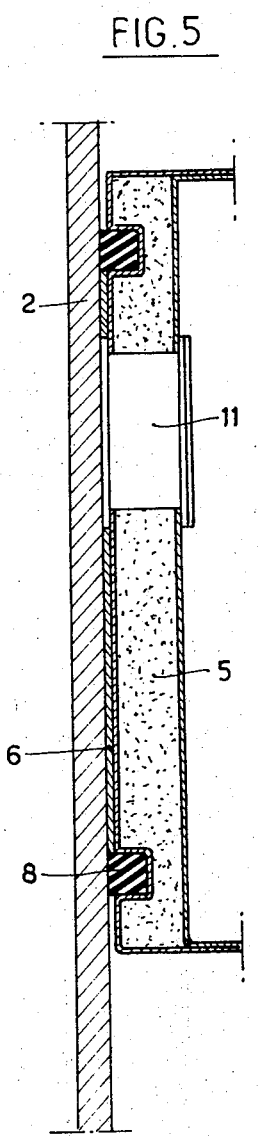
FIG. 5 is a view similar to that of FIG. 3 showing the panel fo FIG. 3 with part of the trolley secured on it.

From this instant onwards, if a trolley 1 is applied laterally against one of the security stations, it depresses the central button 12 of the valve 11 at this station, causing the latter to open. At the same time, it is applied against the whole length of the elastic seal 8 at the periphery of the panel 5, shutting off the ingress of air from the cabin to the space defined between the surface 2 of the trolley and that of the panel 5 (FIG. 5). This space is instantaneously evacuated, the air which it contains being exhausted across the valve 11 and trolley 1 being firmly applied against the panel. The total force involved in equal to the product of the differential pressure developed by the aircraft at this instant, and the area of the panel 5. The side 2 of the trolley thus keeps the elastic seal 8 and thus the button 12 of the valve 11, as well, completely compressed and is applied uniformly against the supporting surace 7 of the panel.

During the whole of the time for which it is secured, the trolley 1 itself maintains the valve 11 in the open position and any ingress of air (for example due to a defect in the seal) is immediately neutralised by exhaust into the exterior.

It will be observed that the operation of securing the trolley is completely automatic, that is to say that the stewardess responsible for the serving operations, simply has to offer the trolley 1 up against the flank of a seat which is equipped with a vacuum panel 5, in order to secure it there.

The trolley 1 can be guided by both hands, and, in turbulent flight conditions, the stewardess can keep the trolley secured in this way without letting go her grip, something which, in addition to being an important factor as far as her own safety is concerned, psychologically facilitates the overall securing operation (in any other system, the stewardess would tend to have to let the trolley go in order to look for something else to hold onto).

The application of the trolley 1 against the panel 5 requires no particular precision because, in the majority of cases, the trolleys have a length which is between 80 cm and 90 cm, this covering and substantially overlapping the vacuum panel 5 which will not be more than 40 cm (the average length of aircraft seats).

For each panel, therefore, there is an infinite number of relative positions on the part of the trolley, all of which nevertheless enable it to be secured.

The lateral displacement of the trolleys is something which can easily be effected if the wheels of the trolley are casters and thereby allowing the trolley to be pivoted about a vertical axis.

One one condition required for operation is at all difficult to satisfy, and this is the application of the flank of the trolley against the whole of the length of the seal. This is not a difficult matter if the two parts to be attached to one another, namely the plane of the wall 2 and the protrusion plane 9, are each vertical planes or, more exactly, planes perpendicular to the aircraft floor at the location where the trolley is standing.

On the other hand, it has to be recognised that the trolley is normally on four wheels and finds its own level. It has a tendency to rest with all four wheels on the aircraft floor which latter is generally covered with a carpet. Because of irregularities in the floor, the carpet and the distribution of weights on the trolley, it may happen that the flank 2 thereof is not in a vertical plane but is in fact 2° or 3° out of the vertical.

On the other hand, the vacuum panel 5 itself will rarely be truely perpendicular to the aircraft floor.

In order to overcome this difficulty, a seal 8 which is extremely flexible and protrudes a considerable amount, as shown in FIG. 7, can be used, this figure showing an armrest 4 canted 3° towards the interior of the seat. A distortion of this order can be compensated for by compressing partially the bottom part of the seal, to a sufficient extent at any rate for contact with the top part of the seal to be achieved before the bottom part is totally compressed.

It will be observed that in this position, the trolley 1 has also come into contact with the button 12 of the valve 11 and has opened the latter, since in the inoperative condition said button extends beyond the protrusion plane 9 of the seal 8, by some few millimetres. The results is that as soon as the seal is effective, the vacuum is applied to the whole area of the panel and the developed force is such that the trolley and the panel are moved closer together by forced straightening up of the armrest 4 and possible tilting of the trolley 1, so that the 3° angle is reduced to 0°.

The seal protrusion which has to be used, thus depends upon the maximum angle it is desired to be able to compensate, that is to say the angle between the flank 2 of the trolley and the armrest 4. This angle is itself a function of the stiffness of the seats and the flexibility of the carpet. The flexibility of the seal determines the ease with which the stewardess can compress it in order to establish the seal and initiate the securing operation.

If substantial distortions are likely to occur, the compensation by the seal may turn out to be unattractive from the aesthetic point of view because of the excessive degree of protrusion which has to be arranged for.

Figure 9:
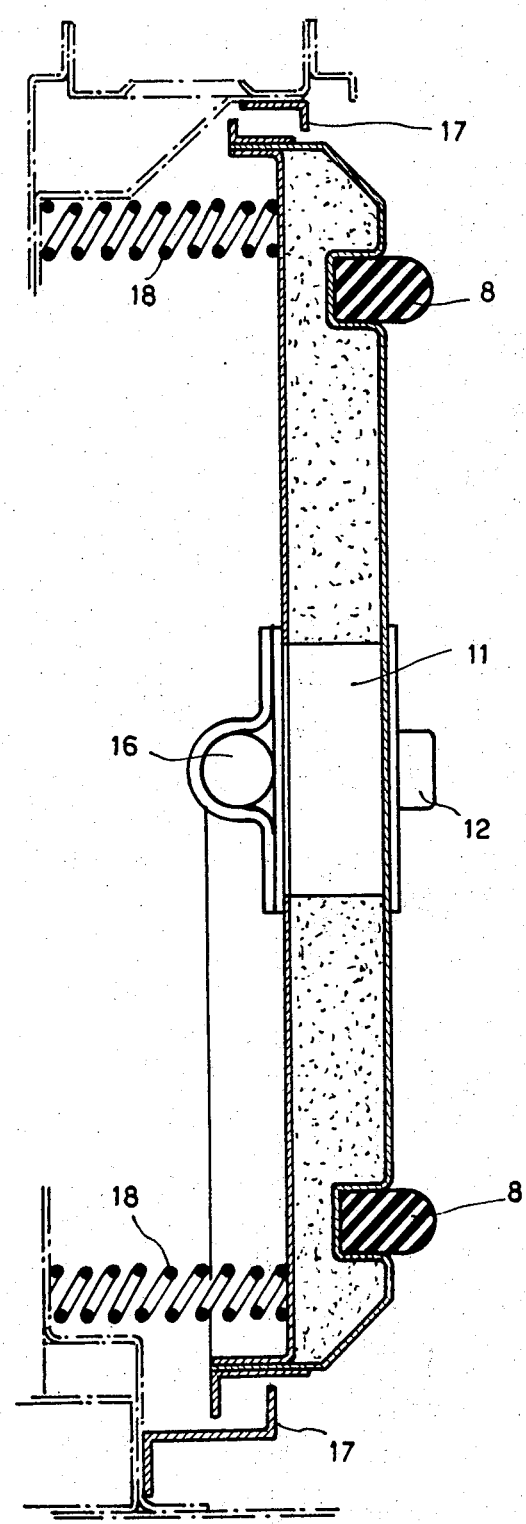
FIG. 9 is a vertical sectional view on a larger scale through a detail of FIG. 8, the view having been rotated through 180°.

Alternatively, the vacuum panel 5 can be mounted to pivot about a horizontal axis, in the manner shown in FIGS. 8 and 9 which illustrate the same case of distortion of the armrest 4 of the seat in an inward direction, the difference between the plane of the wall 2 and the supporting plane 7, here being 6° however.

To compensate for this difference, in this case a vacuum panel 5 is used which is no longer rigidly attached in the flank of the seat but can pivot about a horizontal axis 16 located to the rear of the supporting plane 7.

This axis will preferably extend at half the height of the supporting plane in order to properly distribute the forces and to compensate a maximum angle by a minimum dislocation.

It is also advantageous to place the valve 11 at the level of the axis of pivot 16, so that the pressure of the trolley 1 on the button 12 of the valve 11 can be applied in such a fashion that the button cannot slip nor the valve open before total contact between the trolley and the protrusion plane 9 has been achieved.

In FIG. 8 and 9, the valve 11 is located precisely at the height of the axis 16.

This axis 16 is in fact physically manifested by a pivot carrying a bearing, but it can equally well be a ficticious one. In the latter case, the connection between the oscillating panel 5 and the flank 2 of the seat can be provided by means of a flexible diaphragm located at the periphery of the panel and enabling the latter to oscillate between the stops attached to the seat flank. These stops can if required be used to support the forces exerted by the secured trolley transversely of the aircraft axis.

In the case where the axis is a real physical entity, all the securing forces can fundamentally be transmitted by it (the pivot 16). However, it can be arranged for the stops 17 which limit the oscillation of the panel 5 to carry part of these forces. Whether or not the axis is a real or ficticious one, it is also possible to provide a system of elastic stops 18 which, in the inoperative condition, give the panel a position parallel to the flank of the seat, this for reasons of aesthetic appearance.

Other articulated suspension devices for the panel can be envisaged, all of which, however, involve a horizontal, real or ficticious axis of rotation, located to the rear and at approximately half the height of the panel.

Certain kinds of suspension could equally well be arranged to permit oscillations about a vertical axis, but it does not appear that this characteristic is necessary since the table itself is movable about a vertical axis thanks to its caster wheels.

In order to release a previously secured trolley, the stewardess has to manually operate the three-way valve 14.

In so doing, she cuts off the external vacuum source and, at the same time, supplies air cabin pressure to the valve 11 which is applied to the whole area of the panel, between the flank 2 of the trolley 1 and the supporting flank. A balance between the air pressures on the two faces of the trolley is quickly established and this enables the seal 8 to expand and push the trolley away, disengaging it from the seat. At the same time, the valve 11 automatically closes again. The stewardess can then release the valve 14 which returns to its rest position and the device is ready for operation all over again.

FIGS. 10 to 13 illustrate details of the design of the valves 11 and 14. These have been given purely by way of example and it goes without say that other embodiments are equally possible provided that the essential elements set out hereinafter are incorporated.

The valve 11 (FIGS. 10 and 11) is constituted by a fixed valve body 19 and two moving components, namely a valve element 20 integral with the button 12 and a spring 21, as well as a toroidal rubber seal 22 stuck to the valve body 19 and providing a seal between the valve element 20 and the valve body 19.

In the inoperative condition, the spring 21 makes the valve element 20 seat against the seal 22 and the valve is thus hermetically sealed.

The fitted load of the spring is designed to maintain the valve element 20 in contact with the toroidal seal 22 under a differential pressure which exceeds by about 10 percent the maximum differential pressure which can be achieved in the aircraft in question.

The force which has to be exerted on the trolley 1 in order to open the valve is thus less than the spring force 21 since the pressure difference acts in the same direction as the trolley.

This arrangement is to be preferred for its simplicity, to one in which a valve element is normally held closed by the pressure differential and opened by a tripping device. In other words, in this latter case, in order to open the valve the trolley must overcome not only the pressure difference but the fitted load of the seating spring. The force developed by the differential pressure is by no means negligible if the valve element is to have an opening cross-section sufficient to ensure rapid action during securing and release operations.

In accordance with one particular embodiment, the valve body 19 is split in order to facilitate its assembly on the vacuum panel 5.

The valve body 19 also has a cylindrical connector 23 for its connection to the line 13 connecting it with the valve 14.

Figure 10:
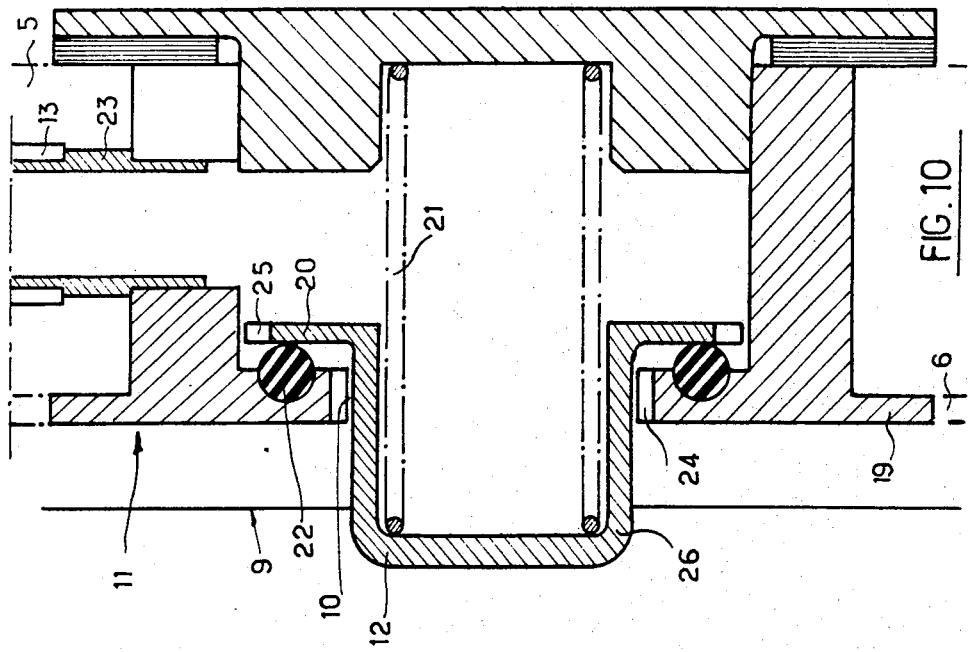
FIG. 10 is a sectional view of an automatic valve, suitable for use in the device shown in FIG. 2, in an inoperative position.

As FIG. 10 shows, the valve element 20 is extended in one piece outside the valve and forms the button 12 which projects beyond the protrusion plane defined hereinbefore.

It goes without saying that this single component could be constituted by two or more assembled components, if production reasons made this desirable.

Figure 11:
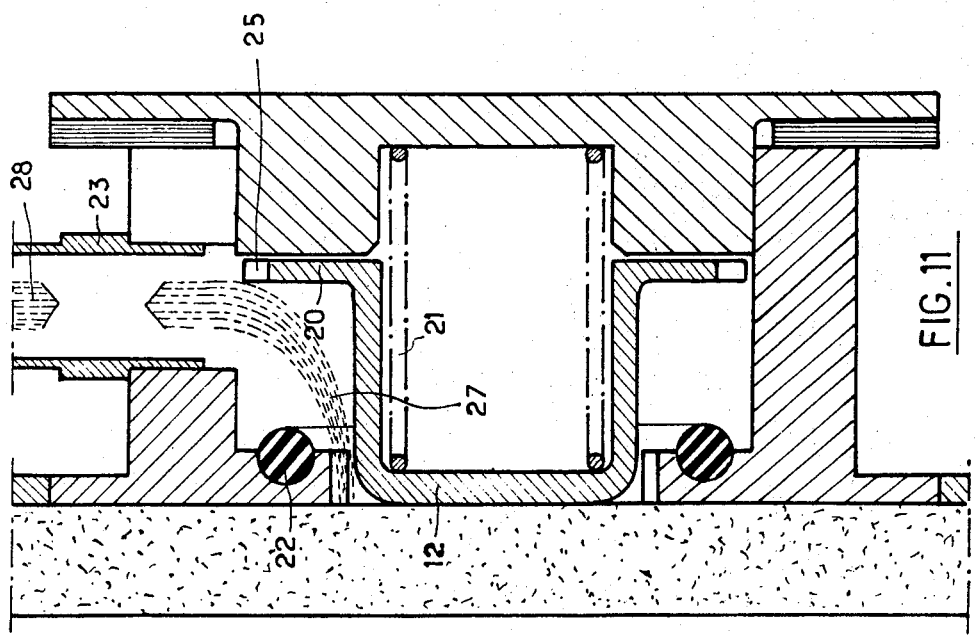
FIG. 11 is a view similar to that of FIG. 10, showing the valve in a security position.

The clearances between the button on the valve element 12, the valve element 20 itself, and the body 19 of the valve, may be sufficient for the flow of induced air across the valve when the valve element is depressed into the open position (FIG. 11).

In accordance with a special embodiment, in order to improve the centering and guidance of the valve element, the clearance is preferably the minimum which will enable the valve element to move properly and ensure the flow of air through appropriate grooves provided respectively at 24 in he valve body and at 25 in the valve element 20.

In accordance with FIG. 10, in order to prevent a vertical corner of the flank 2 of the trolley from fouling the button of the valve when same is in the rest position, the edge 26 of the tip of the button rounded off for a distance to the rear of the tip at least equal to the distance separating the tip of the button 12 and the protrusion plane 9. In this fashion, if the trolley is already up against the protrusion plane, it depresses the button instead of snagging against it.

FIG. 10 also illustrates the example of an assembly and design, on the part of the valve body, in which all the latter's externally visible elements are located at the near side or in the plane of the supporting surface, when the valve element is fully opened. It will be observed that the rough non-slip lining 6 of the panel 5 contains a cylindrical cutout which enables it to be adjusted around the valve body 19 in order to form a supporting plane which projects slightly beyond or is in the same plane as, the valve body.

In FIG. 10, 27 indicates the air flow during securing and 28 the air flow during release.

In FIGS. 12 and 13, the valve 14 is constituted by a fixed valve body 29 and two moving components, namely a valve element 30 and a spring 31, as well as by a toroidal seal 32 and a valve cap 33, both attached to the valve element 30.

The valve element is here made up of several components and extends outside in the form of a lateral handle 34 or axial button 34'. The valve body 29 contains three holes 35, 36 and 38.

The hole 35 is unconnected and opens to the cabin interior. It is normally closed off inside the valve by the valve element 30 and the toroidal seal 32, under the permanent action (in the inoperative condition), of the spring 31. The assembly is such that any leakage due to clearances between the valve element 30 and the valve body 29, is prevented by the toroidal seal 32.

In accordance with an embodiment similar to that shown in respect of the valve 11, grooves in the valve body 29 or in the valve element 13, can be used to perform the duty of the hole 35.

A second hole 36 is permanently connected by the line 13 to the valve 11. It has a cylindrical connector 37 for effecting this connection.

The hole 38 is likewise connected by a connector 39 to the line 15 which is permanently at the pressure prevailing outside the aircraft.

In accordance with the preferred embodiment, the axis of the hole 38 is aligned with the axis of the valve element 30 and the connector 39 of said hole extends inside the body of the valve where it presents a conical face 40 acting as a stop and seat for the cap 33 of the valve element 30.

It will be seen that with the valve element 30 in the rest position, the holes 36 and 38 communicate freely with the valve interior, thus permanently ensuring a vacuum in the valve body 11.

During the securing operation, the valve 14 is left untouched, and does not operate. When the hostess wishes to release a previously secured trolley, she operates the valve element either through the medium of its handle 34 or by pressing its button 34' (FIG. 12). On being fully depressed, the valve element 13 applies its cap 33 against the conical face 40 of the connector 39 associated with hole 38, cutting off the vacuum source. In the same position, the valve element 30 supplies air at cabin pressure between the toroidal seal 32 and the valve body 29 whence it flows through the hole 36 and the line 13 to the valve 11 so that the trolley is released very quickly, taking in the order of 1 to 3 seconds, for example.

Once the stewardess has seen that the trolley is clear, she releases the valve 30 which returns to its rest position and re-establishes the vacuum circuit to the valve 11.

Other embodiments of the valve 14 are possible, but the ones illustrated in FIGS. 11 and 12 is the preferred one in view of the following considerations:

In principle, this valve could be located anywhere in the aircraft but, in order to facilitate insulation, it is advantageous to place it at the same seat assembly as the vacuum panel 5. When the trolley is secured and the seat occupied by passengers, the only easy zone of access for the stewardess is the top corner of the seat back nearest the gangway.

The relatively restricted space available in the height of a seat back, necessitates that the valve be designed so that the two lines 13 and 15 terminate in parallel there, running in an upward direction.

The valve mechanism is manually operated and should therefore be as simple as possible, selectively assuming one of the following two positions without any possible intermediate position:
1. 35 closed — 38 open
2. 35 open — 38 closed The spring 31 is designed to return the valve element to position 1). The manual action is designed to depress the valve element into position 2 against the action of the spring.

Manual action on the valve element should be capable of execution either by a lateral handle 34 or through an axial button 34', depending upon the configuration of the seat back, the other elements of the valve remaining the same.

The valve element stop in the two positions, should be constituted by the toroidal seal 32 or the cap 33.

It goes without saying that the present invention is in no way limited to the embodiments described and illustrated here, but covers all the possible variant embodiments. Thus, in particular, means could be provided to lock the valve element 30 in the position shown in FIG. 12, in order to be able to permanently cut off the vacuum source from the panel 5 in the event of a leak at the valve 11 when in the inoperative condition, between said valve and the valve 14.

What I claim as my invention and desire to secure by Letters Patent of the United States is:

1. A suction security device for securing an aircraft serving trolley having at least one substantially flat, rigid, smooth and upright panel, to an aircraft seat, which comprises, a suction panel disposed on a side of said seat facing an aircraft gangway below the level of an armrest on said seat, and constituted by a rigid wall having an upright generally flat supporting face, surrounded by a seal, which face, in use, stands proud of the seat at the fron thereof, front supporting face having a surface of such shape and dimensions that in the operative condition of the device, it is completely covered by the panel on the trolley, and said seal being constituted by a continuous resilient strip which, in the inoperative condition of the device exhibits a substantially constant proturberance from the supporting face over the whole of its length so as to define a plane of protrusion parallel to the supporting surface; comprising a first valve, closed in the rest condition and located to the rear of said supporting surface, said valve communicating firstly with an opening in said supporting face, and secondly with a source of suction, said valve being provided with means for automatically opening it when the panel of the trolley is applied against the suction panel, with the result that the source of suction is made to communicate with a closed space delimited between the suction panel, the seal and the panel of the trolley, enabling at least some of the air contained in said space to be drawn off to the suction source whereby the panel of the trolley is applied more firmly against the supporting face and is maintained there; and comprising a second manually operated three-way valve, having its operating means disposed remote from the suction panel, connected between said first valve, the suction source and with air at the pressure of the air surrounding the trolley outside said closed space, said valve being arbitrarily operable to cut off communication between the panel and the suction source and to, simultaneously, place said panel in communication with the air at the pressure surrounding said trolley, whereby said lastmentioned air can be returned to the space defined between the panel of the trolley, the vacuum panel and the seal, to release said trolley from the suction panel.

2. A security device as claimed in claim 1, wherein the aircraft is pressurised, and wherein the suction source is constituted by the atmosphere outside the aircraft.

3. A security device as claimed in claim 2, wherein the supporting surface is provided with indentations or grooves to increase the coefficient of friction of the surface and to ensure, during the operative condition of the device, communication of air over generally the whole of the supporting surface, with said first valve.

4. A security device as claimed in claim 1, wherein the seal is fitted in a groove in said wall.

5. A security device as claimed in claim 1, wherein the suction panel is, in use, fitted to said seat in such manner that it may pivot about a horizontal axis located to the rear of the supporting face approximately at half the height thereof.

6. A security device as claimed in claim 5, wherein the first valve is located substantially at the height of said axis of oscillation.

7. A security device as claimed in claim 1, wherein said first valve is attached directly to the suction panel behind the supporting face and, wherein said first valve communicates with an air exhaust opening in said supporting face and with the suction source, wherein said first valve includes a first valve element which is closed in the rest condition under the action of a spring, wherein said first valve element is fitted with an extension piece which, in the rest condition, passes through the air exhaust opening up to a point beyond the said protrusion plane whereby, when the panel of the trolley is applied against the seal of the suction panel, the said valve element is directly and automatically opened by the extension piece being depressed by the panel of the trolley, said open condition being also maintained automatically during the whole of the operative condition.

8. A security device as claimed in claim 1, wherein the three-way manual valve and the suction lines connected thereto, are, in use, disposed on the same seat as carries the suction panel which they control.

9. A security device as claimed in claim 1, wherein the connections between the second valve and the vacuum source and first valve, are in the form of two parallel connections fitted to the body of said three-way valve, wherein the second valve includes a second valve element which is disposed coaxially both with a first opening via which the line connected to the suction source communicates on the axis of the connection with the interior of the valve and also with a second opening via which the interior of the valve communicates with air at the pressure of the air surrounding the closed space, wherein the said second valve element is biased by a spring in order, in the rest condition, to close off the second opening and wherein said second valve element is movable manually against the action of said spring by means of a handle or button attached directly to said second valve element through said second opening, to allow air at the pressure of the air surrounding said object to pass via the interior of the valve to the vacuum panel, and to simultaneously close off the first opening, said valve element reverting automatically to its initial rest position when the manual effort is released.

10. Suction security apparatus for securing a trolley having at least one substantially flat, rigid side to an aircraft seat in a pressurized aircraft, which comprises:
 a. suction means disposed on said trolley operative to secure said trolley at said at least one substantially flat, rigid side by suction when said suction means is activated by said at least one substantially flat side, said suction means comprising a connection to the exterior of the aircraft operative to exhaust air from within the aircraft; and
 b. means for releasing said suction to permit movement of said trolley.

* * * * *

UNITED STATES PATENT OFFICE
CERTIFICATE OF CORRECTION

Patent No. 3,823,900           Dated July 16, 1974

Inventor(s) Robert Rene Marechal

It is certified that error appears in the above-identified patent and that said Letters Patent are hereby corrected as shown below:

On the cover sheet insert:

-- Foreign Application Priority Data

France    71.20290    May 28, 1971--

Signed and sealed this 4th day of February 1975.

(SEAL)
Attest:

McCOY M. GIBSON JR.          C. MARSHALL DANN
Attesting Officer            Commissioner of Patents